(12) United States Patent
Goto et al.

(10) Patent No.: US 11,198,520 B2
(45) Date of Patent: Dec. 14, 2021

(54) AIRCRAFT COMPONENT POSITIONING DEVICE, AND AIRCRAFT ASSEMBLY SYSTEM

(71) Applicant: MITSUBISHI HEAVY INDUSTRIES, LTD., Tokyo (JP)

(72) Inventors: Takuya Goto, Tokyo (JP); Tsuyoshi Kaneko, Tokyo (JP); Hiroto Mori, Tokyo (JP); Michinobu Takahagi, Tokyo (JP); Hideyuki Suzuki, Tokyo (JP); Junichi Takeshita, Tokyo (JP); Jiro Wada, Tokyo (JP); Katsumi Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 90 days.

(21) Appl. No.: 15/546,197

(22) PCT Filed: Jan. 27, 2016

(86) PCT No.: PCT/JP2016/052364
§ 371 (c)(1),
(2) Date: Jul. 25, 2017

(87) PCT Pub. No.: WO2016/121825
PCT Pub. Date: Aug. 4, 2016

(65) Prior Publication Data
US 2017/0369186 A1 Dec. 28, 2017

(30) Foreign Application Priority Data
Jan. 28, 2015 (JP) .............................. JP2015-014467

(51) Int. Cl.
*B64F 5/10* (2017.01)
*B25J 9/16* (2006.01)
(Continued)

(52) U.S. Cl.
CPC ................ *B64F 5/10* (2017.01); *B23P 21/00* (2013.01); *B25J 9/1687* (2013.01); *B25J 9/1694* (2013.01);
(Continued)

(58) Field of Classification Search
CPC .......... B64F 5/10; B64C 1/068; G05B 19/402
See application file for complete search history.

(56) References Cited

U.S. PATENT DOCUMENTS 6,314,630 B1 11/2001 Munk et al.
6,317,954 B1 11/2001 Cunningham et al.
(Continued)

FOREIGN PATENT DOCUMENTS

JP 2004-302221 A 10/2004
JP 2005-153094 A 6/2005
(Continued)

OTHER PUBLICATIONS

PCT, "International Search Report for International Application No. PCT/JP2016/052364" dated Apr. 26, 2016.
(Continued)

*Primary Examiner* — David P Bryant
*Assistant Examiner* — Kyle A Cook
(74) *Attorney, Agent, or Firm* — Manabu Kanesaka; Kenneth Berner; Benjamin Hauptman (57) ABSTRACT

The object is to provide an aircraft component positioning device, an aircraft assembly system, and an aircraft assembly method with which it is possible to precisely dispose components on a planar member of an aircraft without using a positioning jig. A positioning device (2) includes a detection unit (5) that detects positions of a plurality of first components installed on a planar member of an aircraft, a virtual position creation unit (6) that creates a virtual position between the plurality of first components on the basis of
(Continued)

the positions of the plurality of first components that are detected, and a position determination unit (7) that, on the basis of the virtual position that is created, determines an installation position of a second component, different from the plurality of first components, that is installed on the planar member.

3 Claims, 5 Drawing Sheets

(51) Int. Cl.
   *G05B 19/402* (2006.01)
   *B64C 1/06* (2006.01)
   *B23P 21/00* (2006.01)
   *G05B 19/418* (2006.01)

(52) U.S. Cl.
   CPC ............ *B64C 1/068* (2013.01); *G05B 19/402* (2013.01); *B23P 2700/01* (2013.01); *B25J 9/1697* (2013.01); *G05B 19/41805* (2013.01); *Y02P 90/02* (2015.11)

(56) References Cited

U.S. PATENT DOCUMENTS

| | | | |
|---|---|---|---|
| 6,408,517 | B1 | 6/2002 | Lehmker et al. |
| 2001/0054228 | A1 | 12/2001 | Lehmker et al. |
| 2002/0066192 | A1 | 6/2002 | Cunningham et al. |
| 2002/0078545 | A1 | 6/2002 | Munk et al. |
| 2005/0116105 | A1 | 6/2005 | Munk et al. |
| 2008/0205763 | A1 | 8/2008 | Marsh et al. |
| 2010/0049354 | A1 | 2/2010 | Stark et al. |
| 2011/0234789 | A1 | 9/2011 | Koike |
| 2014/0375794 | A1 | 12/2014 | Singh |
| 2016/0008981 | A1 | 1/2016 | Oberoi et al. |
| 2016/0167809 | A1* | 6/2016 | Jurbert ............. B64F 5/50 29/428 |

FOREIGN PATENT DOCUMENTS

| | | |
|---|---|---|
| JP | 2008-146084 A | 6/2008 |
| JP | 2009-535612 A | 10/2009 |
| JP | 4385238 B2 | 12/2009 |
| JP | 2010-520104 A | 6/2010 |
| JP | 4627542 B2 | 2/2011 |
| JP | 2016-016860 A | 2/2016 |

OTHER PUBLICATIONS

PCT, "Written Opinion of the International Searching Authority for International Application No. PCT/JP2016/052364" dated Apr. 26, 2016.

Europe Patent Office, "Search Report for European Patent Application No. 16743428.1," dated Dec. 14, 2017.

Canada Patent Office, "Office Action for Canadian Patent Application No. 2974790," dated Jul. 25, 2019.

* cited by examiner

AIRCRAFT COMPONENT POSITIONING DEVICE, AND AIRCRAFT ASSEMBLY SYSTEM

RELATED APPLICATIONS

The present application is National Phase of International Application No. PCT/JP2016/052364 filed Jan. 27, 2016, and claims priority from Japanese Application No. 2015-014467, filed Jan. 28, 2015, the disclosure of which is hereby incorporated by reference herein in its entirety.

TECHNICAL FIELD

The present invention relates to an aircraft component positioning device, an aircraft assembly system, and an aircraft assembly method used when an aircraft component is installed to another component.

BACKGROUND ART

Structural bodies provided in the fuselage, wings, and the like of an aircraft have three-dimensional curved surfaces and combinations of low-rigidity components in order to ensure the final rigidities of those structural bodies. Thus during assembly, individual structural components are attached to other components at predetermined positions using positioning jigs. A positioning jig has, for example, a plurality of recessed portions defined therein. Structural components are placed in the recessed portions, and the positioning jig then approaches the other components on the basis of a reference point. As a result, the structural components are attached at the predetermined positions.

If many structural components are to be positioned at the same time using a positioning jig, there will be less space between the structural components, which makes it difficult for the worker attaching the components to work. Thus to improve the workability, the positioning jig is required to be configured such that there are no narrow spaces that can be accessed by the worker.

Accordingly, the process for attaching components is typically divided into multiple steps, and a different positioning jig is used in each step. This makes it possible to increase the spaces between the structural components. Workpieces are moved to the dedicated positioning jigs provided for each step, and after all the steps have been carried out, the workpieces are completed as the final structural body. Because each workpiece are moved amongst a plurality of jigs, the tolerances of the jigs accumulate with respect to workpiece by the number of jigs that are used. This means that the quality of the structural body ultimately assembled depends on the precision of the jigs.

Patent Document 1, indicated below, discloses technology for precisely assembling large products such as large aircraft fuselages.

CITATION LIST

Patent Document

Patent Document 1: U.S. Pat. No. 6,408,517 specification

SUMMARY OF INVENTION

Technical Problem

To improve the quality of the structural bodies assembled, it is necessary to use high-precision positioning jigs. However, making a high-precision jig is difficult, and thus there is demand for other methods for improving the quality of assembled products and improving productivity without using jigs. In one such method, when coupling holes for coupling together components to be attached are defined, the holes are precisely defined in the components and the positioning is accomplished by aligning the coupling holes. However, in the aircraft industry, there are many components subjected to sheet metal processing, and it is difficult to ensure that the components themselves are processed with precision. It is therefore difficult to position components with precision using coupling holes.

Having been achieved in light of such circumstances, an object of the present invention is to provide an aircraft component positioning device, an aircraft assembly system, and an aircraft assembly method with which it is possible to precisely dispose components on a plate-shaped member of an aircraft without using a positioning jig.

Solution to Problem

An aircraft component positioning device according to a first aspect of the present invention includes a detection unit, a virtual position creation unit, and a position determination unit. The detection unit detects positions of a plurality of first components installed on a planar member of an aircraft. The virtual position creation unit creates a virtual position between the plurality of first components on the basis of the positions of the plurality of first components that are detected. The position determination unit, on the basis of the virtual position that is created, determines an installation position of a second component, different from the plurality of first components, that is installed on the planar member.

According to this configuration, the installation position of the second component, which is different from the plurality of first components, is determined to be at a virtual position including the plurality of first components or a position separated from the virtual position by a predetermined distance, on the planar member of the aircraft on which the plurality of first components are installed. Accordingly, the second component can be precisely attached to the planar member, without using a positioning jig.

In the above-described first aspect, the detection unit may detect an installation hole, defined in the planar member, in which the second component is installed; and the position determination unit may determine the installation position of the second component on the basis of the created virtual position and the detected installation hole.

In the above-described first aspect, the virtual position creation unit may create two or more of the virtual positions on the basis of at least three of first components of the plurality of first components; and the position determination unit may determine the installation position of the second component on the basis of the two or more created virtual positions.

An aircraft assembly system according to a second aspect of the present invention includes the above-described aircraft component positioning device and an aircraft component attachment device that installs the second component on the planar member on the basis of an installation position of the second component determined by the aircraft component positioning device.

An aircraft assembly method according to a third aspect of the present invention includes the steps of: detecting positions of a plurality of first components installed on a planar member of an aircraft; creating a virtual position between the plurality of first components on the basis of the positions of the plurality of first components that are detected; and determining, on the basis of the virtual position that is created, an installation position of a second component different from the plurality of first components and installed on the planar member.

In the above-described third aspect, the method may further include a step of installing the second component on the planar member on the basis of the installation position of the second component that is determined.

Advantageous Effects of Invention

According to the present invention, components can be disposed on a planar member of an aircraft with precision, without using a positioning jig.

DESCRIPTION OF EMBODIMENTS

Hereinafter, an aircraft assembly system according to an embodiment of the present invention will be described.

An aircraft assembly system 1 assembles a fuselage, wings, or the like of an aircraft. Structural bodies such as the fuselage and the wings are configured by combining a plurality of structural components. The fuselage, the wings, and the like are configured by coupling together structural bodies and a thin plate member (a skin). The aircraft assembly system 1 includes a positioning device 2 that determines an installation position of a structural component on the thin plate member, and an attachment device 3 that attaches the structural component to the thin plate member. In the following, a structural component being attached to the thin plate member refers both to a case where the structural component is attached directly to the thin plate member and to a case where the structural component is attached to the thin plate member with another component located therebetween.

Figure 1:
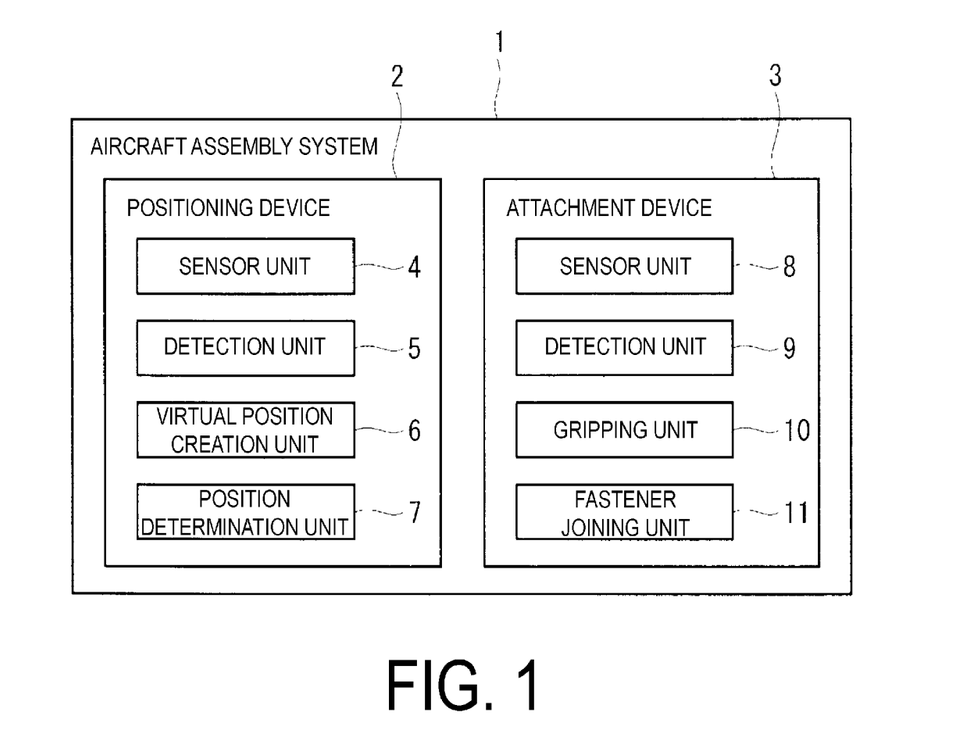
FIG. 1 is a block diagram illustrating an aircraft assembly system according to an embodiment of the present invention.

As illustrated in FIG. 1, the positioning device 2 includes a sensor unit 4, a detection unit 5, a virtual position creation unit 6, a position determination unit 7, and the like. The detection unit 5, the virtual position creation unit 6, and the position determination unit 7 are realized by a control device such as a computer that executes programs.

The attachment device 3 is a robot, for example, and includes a sensor unit 8, a detection unit 9, a gripping unit 10, a fastener joining unit 11, and the like. Note that in the case where the attachment device 3 is a robot, the sensor unit 4 or the like of the positioning device 2 may be provided in the robot. The sensor unit 4 and the detection unit 5 of the positioning device 2 may then also function as the sensor unit 8 and the detection unit 9 of the attachment device 3. The detection unit 9 is realized by a control device such as a computer that executes programs.

Figure 2:
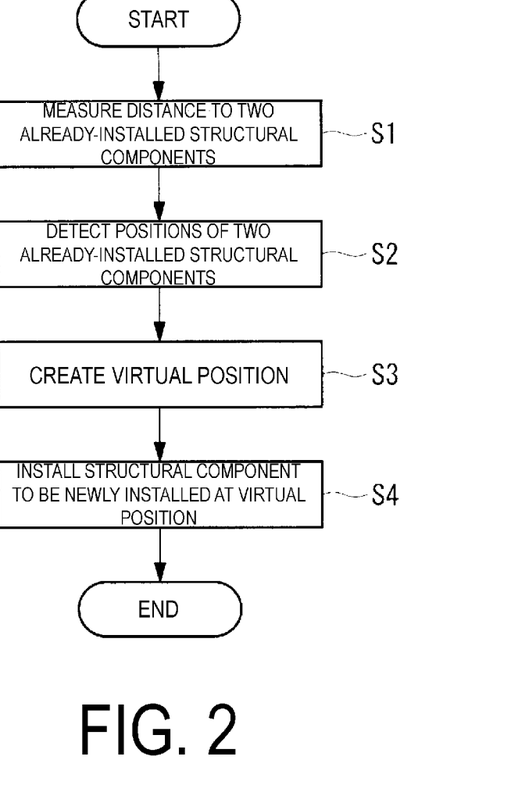
FIG. 2 is a flowchart illustrating operations of the aircraft assembly system according to the embodiment of the present invention.

The sensor unit 4 of the positioning device 2 is a laser rangefinder or an imaging device such as a camera, for example. The sensor unit 4 measures the distance to a subject, for example a structural component 13 already installed on a thin plate member 12 of an aircraft, as illustrated in FIG. 2. The sensor unit 4 sends a result of the measurement to the detection unit 5. The sensor unit 4 may measure the distance to an installation hole 15, defined in the thin plate member 12, for a structural component 14 to be newly installed (see FIGS. 2 and 5). Note that the thin plate member 12 is an example of a planar member.

The detection unit 5 detects the position of a subject, for example the above-described structural component 13 that is already installed, on the basis of distance information obtained as a result of the measurement performed by the sensor unit 4. The detected position corresponds to position information such as coordinate points relative to a given reference point (origin). Meanwhile, a plurality of representative points may be extracted for a single already-installed structural component 13, and the position of each representative point may then be detected. Note that when the distance to the installation hole 15 defined in the thin plate member 12 is measured by the sensor unit 4, the detection unit 5 detects the position of the installation hole 15.

The virtual position creation unit 6 creates a virtual position between a plurality of subjects, for example, already-installed structural components 13. The virtual position may be a virtual line or a virtual plane. In the case where the position of a single representative point is detected for a single already-installed structural component 13, a virtual line is created by connecting the positions of two already-installed structural components 13. Alternatively, in the case where the positions of two representative points are detected for a single already-installed structural component 13, a virtual plane is created by connecting the corresponding two positions of the two already-installed structural components 13.

The virtual position creation unit 6 may create two or more virtual positions (virtual lines or virtual planes) on the basis of at least three already-installed structural components 13.

The position determination unit 7 determines, on the basis of the created virtual position, the installation position of the structural component 14 to be newly installed on the thin plate member 12. The position determination unit 7 may determine the installation position of the newly-installed structural component 14 in light of the detected position of the installation hole 15 for the newly-installed structural component 14. In the case where two or more virtual positions are created, the position determination unit 7 determines the installation position of the newly-installed structural component 14 on the basis of the two or more virtual positions, by averaging two of the virtual positions, for example.

The sensor unit 8 of the attachment device 3 is a laser rangefinder or an imaging device such as a camera, for example. The sensor unit 8 measures the distance to a subject. The sensor unit 8 measures the distance to the installation position of a newly-installed structural component 14, for example.

The detection unit 9 detects the position of a subject, for example, the above-described newly-installed structural component 14, on the basis of distance information obtained as a result of the measurement performed by the sensor unit 8.

The gripping unit 10 grips the structural component 14 to be installed, and moves the structural component 14 to the position where that component is to be newly installed on the basis of the result from the detection unit 9 and the virtual position determined by the positioning device 2. The gripping unit 10 releases the structural component 14 after the structural component 14 has been fixed using a fastener.

The fastener joining unit 11 joins the structural component 14, which has been moved to the position where that component is to be newly installed, to the thin plate member 12 using a fastener. The fastener is a bolt, a rivet, or the like.

Figure 3:
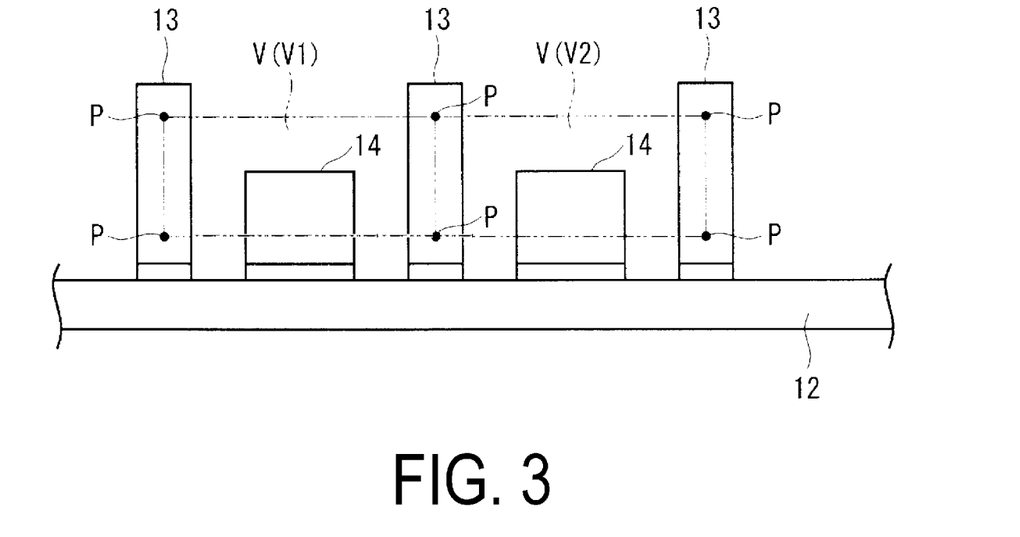
FIG. 3 is a side view illustrating a thin plate member and a structural component placed on the thin plate member.
Figure 5:
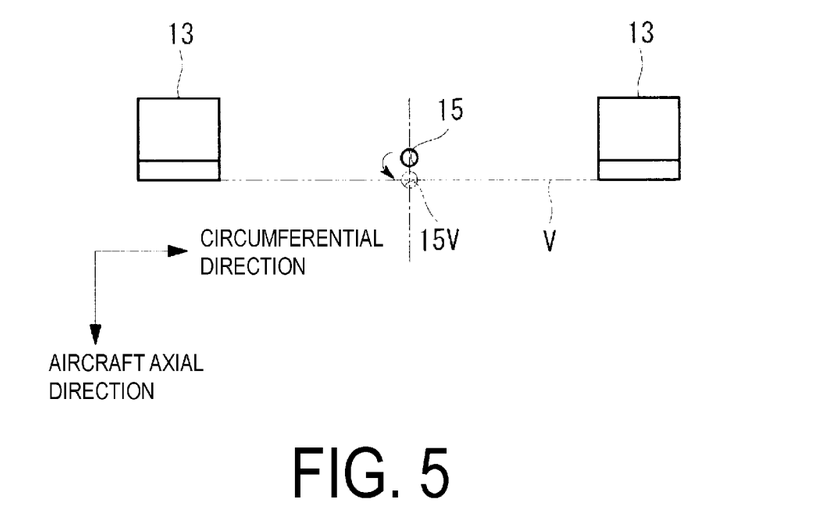
FIG. 5 is a plan view illustrating a structural component placed on a thin plate member and an installation hole.

Next, an aircraft component assembly method will be described with reference to the flowchart in FIG. 2, as well as FIGS. 3 and 5.

First, the sensor unit 4 of the positioning device 2 measures distances to two structural components 13 already installed on the thin plate member 12 (step S1). The measurement results are then sent from the sensor unit 4 to the detection unit 5. Then, the detection unit 5 detects the positions of the already-installed structural components 13 (step S2). At this time, the position of one or more representative points P is detected for each structural component 13.

Figure 4:
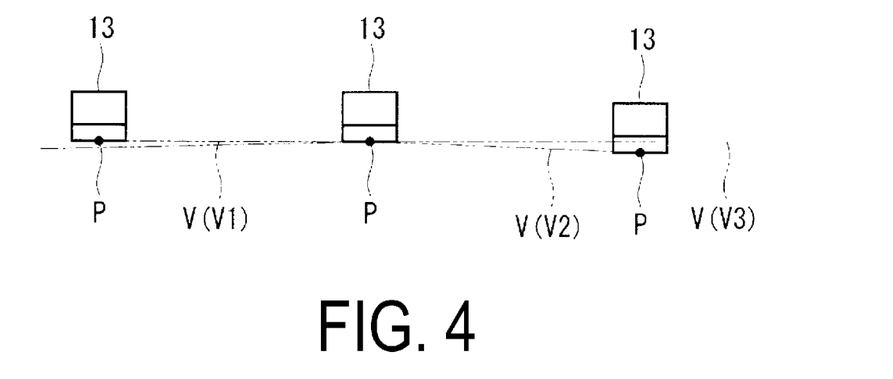
FIG. 4 is a plan view illustrating a structural component placed on a thin plate member.

Next, the virtual position creation unit 6 creates the virtual position such as a virtual line or a virtual plane between the already-installed structural components 13 on the basis of the positions of the representative points P of the two structural components 13 (step S3). In the example illustrated in FIG. 3, a virtual plane V is created. At this time, two or more virtual positions may be created on the basis of the positions of the representative points P of three or more structural components 13, and an averaged virtual position may then be created. For example, as illustrated in FIGS. 3 and 4, two virtual planes V1 and V2 are created on the basis of the positions of the representative points P of three structural components 13. A virtual plane V3 is then created in a position obtained by averaging the two virtual planes V1 and V2.

On the other hand, the structural component 14 to be newly installed is gripped by the gripping unit 10 of the attachment device 3 to prepare for installation. After the virtual position has been created, the gripping unit 10 moves and places the structural component 14 to be newly installed at the virtual position determined as the position where the component is to be newly installed. In the example illustrated in FIGS. 3 and 4, the newly-installed structural component 14 is placed on the virtual plane V1, V2, or the virtual plane V3 obtained as an averaged position. Then, the structural component 14 placed at the installation position is joined by the fastener joining unit 11 using a fastener (step S4).

In the case where an installation hole 15 is already defined at the installation position of the structural component 14 to be newly installed, the distance to the installation hole 15 may be measured by the sensor unit 4, and the position of the installation hole 15 may be detected by the detection unit 5. At this time, the installation position of the newly-installed structural component 14 is determined by the position determination unit 7 on the basis of the detected position of the installation hole 15 and the created virtual position. For example, as illustrated in FIG. 5, an installation position 15V for the newly-installed structural component 14, which is located between the two structural components 13, is determined so as to be located on the same axis as the installation hole 15 (on an axis in an aircraft axial direction) with respect to a direction parallel to the virtual plane V (a circumferential direction of the fuselage skin, for example), and determined so as to be located within the virtual plane V with respect to a direction perpendicular to the virtual plane V (the aircraft axial direction).

Example

Figure 6:
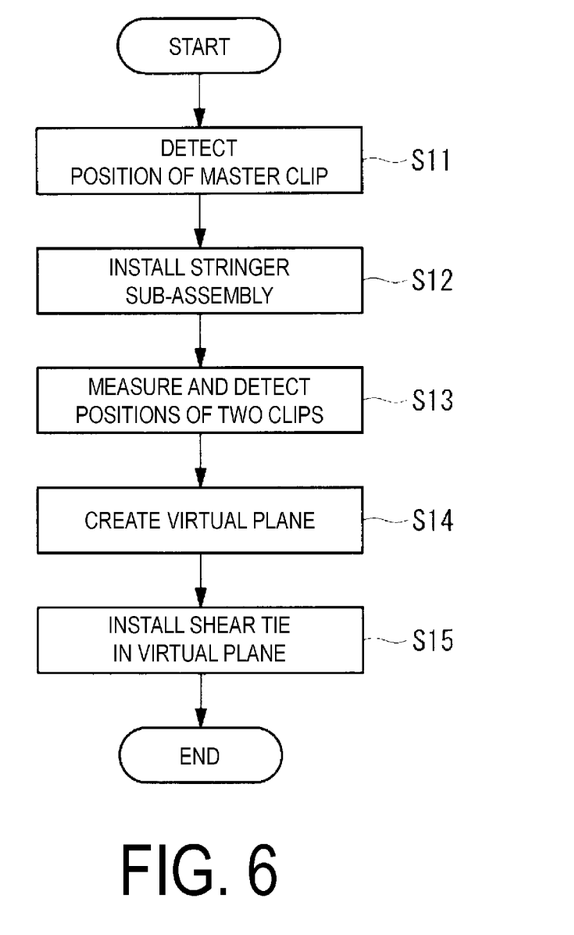
FIG. 6 is a flowchart illustrating operations in an example of the aircraft assembly system according to the embodiment of the present invention.

Next, an example of a case where an aircraft fuselage is assembled will be described with reference to FIGS. 6 and 7. The completed fuselage is constituted of a skin 21 and a plurality of structural components. In the following, the plurality of structural components are stringers, clips, shear ties, and the like.

Figure 7:
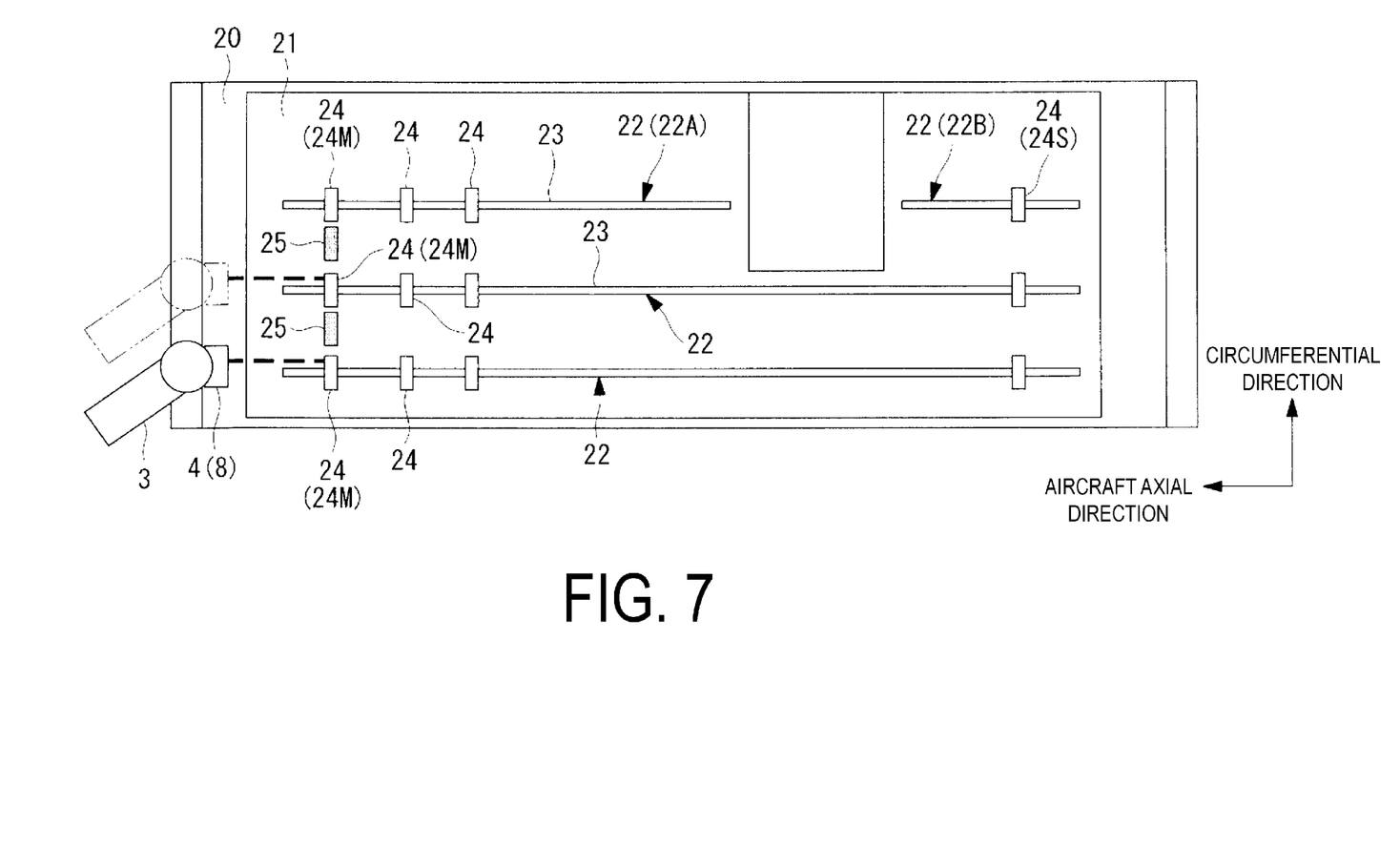
FIG. 7 is a plan view illustrating a skin and structural parts constituting an aircraft fuselage.

As illustrated in FIG. 7, when the assembly is started, the skin (thin plate member) 21 is fixed in a reference position by a jig 20 in advance.

First, a stringer sub-assembly 22 is installed on the skin 21. The stringer sub-assembly 22 is an assembly in which a plurality of clips 24 are installed at, for example, equal intervals with respect to a stringer 23. Note that some of the clips 24 are not illustrated in FIG. 7. Before the stringer sub-assembly 22 is installed on the skin 21, the clips 24 are installed on the stringer 23 such that the stringer sub-assembly 22 is already in an assembled state.

One of the clips 24 installed in the stringer sub-assembly 22 is taken as a master clip 24M. Then, positioning is carried out using the sensor unit 4 (or the sensor unit 8) such as a laser rangefinder so as to position the master clip 24M at an attachment position on the skin 21 (step S11). Upon the master clip 24M being positioned at the attachment position, the stringer sub-assembly 22 is fixed to the skin 21 using fasteners (step S12). By repeating this process for a plurality of stringer sub-assemblies 22, the plurality of stringer sub-assemblies 22 are fixed to the skin 21 with the respective master clips 24M thereof aligned at the attachment positions.

Next, the positioning device 2 measures distances to the clips 24 of two adjacent stringer sub-assemblies 22, and detects the positions of those two clips 24 (step S13). A virtual plane is then created between the two clips 24 (step S14). Thereafter, the attachment device 3 moves and places a shear tie 25, which is to be newly installed, at the created virtual position. The shear tie 25 that has been placed is fixed to the skin 21 by the fastener joining unit 11. This process is repeated for a plurality of clips 24, such that virtual planes are created and shear ties 25 are joined at those virtual planes (step S15).

As a result, the newly-installed shear ties 25 are disposed at attachment positions on the skin 21 with the clips 24 and the shear ties 25 aligned. Here, the assembly process can be carried out precisely without using a conventional positioning jig.

In the case where another stringer sub-assembly 22B separate in the axial direction is to be installed, one of the clips 24 of the other stringer sub-assembly 22B may be taken as a sub-master clip 24S, and the other stringer sub-assembly 22B separate in the axial direction may be installed on the basis of the position of the master clip 24M of the one stringer sub-assembly 22A and the position of the sub-master clip 24S.

Although the foregoing embodiment describes a case where the newly-installed structural component is installed at the same position as the created virtual position, the present invention is not limited to this example. That is, the newly-installed structural component may be installed at a position separated from the created virtual position by a predetermined distance.

REFERENCE SIGNS LIST

1 Aircraft assembly system
2 Positioning device
3 Attachment device
4, 8 Sensor unit
5, 9 Detection unit
6 Virtual position creation unit
7 Position determination unit
10 Gripping unit
11 Fastener joining unit
12 Thin plate member
13, 14 Structural component
15 Installation hole

The invention claimed is:

1. An aircraft component positioning device comprising:
a detection unit that detects positions of a plurality of representative points for each of a plurality of first structural components directly installed on a planar member of an aircraft;
a virtual position creation unit that obtains the detected positions of the plurality of representative points of the plurality of first structural components and creates a virtual plane between the plurality of first structural components by connecting the positions of the plurality of representative points of the plurality of first structural components; and
a position determination unit that, on a basis of the created virtual plane, determines an installation position of a second structural component, different from the plurality of first structural components, that is to be directly installed on the planar member so that the installation position of the second structural component is determined in a position between the plurality of first structural components on the planar member, wherein the virtual position creation unit creates two virtual planes on a basis of positions of the plurality of representative points of three first structural components, and creates a third virtual plane obtained as an averaged position by averaging the two virtual planes; and the position determination unit determines the installation position of the second structural component on a basis of the third virtual plane obtained as the averaged position.

2. The aircraft component positioning device according to claim 1, wherein the detection unit detects an installation hole, defined in the planar member, in which the second structural component is installed; and the position determination unit determines the installation position of the second structural component on the basis of the third virtual plane obtained as the averaged position and the detected installation hole.

3. An aircraft assembly system comprising:
the aircraft component positioning device according to claim 1; and
an aircraft component attachment device that installs the second structural component on the planar member on a basis of an installation position of the second structural component determined by the aircraft component positioning device.

* * * * *